US011155665B2

(12) United States Patent
Dronet et al.

(10) Patent No.: US 11,155,665 B2
(45) Date of Patent: Oct. 26, 2021

(54) PROCESS FOR PREPARING POLYDIENE/POLYLACTIDE COPOLYMERS BY REACTIVE EXTRUSION

(71) Applicant: COMPAGNIE GENERALE DES ETABLISSEMENTS MICHELIN, Clermont-Ferrand (FR)

(72) Inventors: Severin Dronet, Clermont-Ferrand (FR); Gilles Mioche, Clermont-Ferrand (FR); Lise Maisonneuve, Clermont-Ferrand (FR); Nathalie Coste, Clermont-Ferrand (FR); Julien Cayuela, Saint-Saulve (FR); Leila Bonnaud, Valenciennes (FR); Philippe Ghislain Dubois, Ciplet (BE)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 276 days.

(21) Appl. No.: 16/472,280

(22) PCT Filed: Dec. 21, 2017

(86) PCT No.: PCT/FR2017/053796
§ 371 (c)(1),
(2) Date: Jun. 21, 2019

(87) PCT Pub. No.: WO2018/115776
PCT Pub. Date: Jun. 28, 2018

(65) Prior Publication Data
US 2021/0130526 A1 May 6, 2021

(30) Foreign Application Priority Data

Dec. 21, 2016 (FR) ...................................... 1663040

(51) Int. Cl.
| C08F 293/00 | (2006.01) |
| C08F 36/14 | (2006.01) |
| C08G 63/08 | (2006.01) |
| C08K 5/50 | (2006.01) |
| C08K 5/527 | (2006.01) |

(52) U.S. Cl.
CPC ............ *C08F 293/00* (2013.01); *C08F 36/14* (2013.01); *C08G 63/08* (2013.01); *C08K 5/50* (2013.01); *C08K 5/527* (2013.01)

(58) Field of Classification Search
None
See application file for complete search history.

(56) References Cited

U.S. PATENT DOCUMENTS

| 6,114,495 A | 9/2000 | Kolstad et al. |
| 6,143,863 A | 11/2000 | Gruber et al. |
| 6,166,169 A * | 12/2000 | Fritz ................... C08G 63/823 528/176 |
| 6,344,506 B2 | 2/2002 | Vasseur |
| 8,763,660 B2 | 7/2014 | Araujo Da Silva et al. |
| 8,833,417 B2 | 9/2014 | Araujo Da Silva et al. |
| 9,487,614 B2 | 11/2016 | Matmour et al. |
| 10,266,690 B2 | 4/2019 | Coupin |
| 10,273,356 B2 | 4/2019 | Coupin |
| 2001/0056138 A1 | 12/2001 | Vasseur |
| 2009/0165919 A1 | 7/2009 | Araujo Da Silva et al. |
| 2010/0063189 A1 | 3/2010 | Araujo Da Silva et al. |
| 2011/0203712 A1 | 8/2011 | Araujo Da Silva et al. |
| 2011/0303338 A1 | 12/2011 | Araujo Da Silva et al. |
| 2015/0031810 A1 | 1/2015 | Araujo Da Silva et al. |
| 2015/0299367 A1 | 10/2015 | Matmour et al. |
| 2016/0152824 A1 * | 6/2016 | Coupin ..................... C08L 3/02 521/140 |
| 2017/0044362 A1 * | 2/2017 | Coupin .................... C08J 3/005 |
| 2019/0194450 A1 | 6/2019 | Coupin |

FOREIGN PATENT DOCUMENTS

| EP | 0912624 B1 | 12/2004 |
| JP | 2012-158738 A | 8/2012 |
| JP | 5152804 B2 | 2/2013 |
| JP | 2016145294 A * | 8/2016 |
| KR | 20140120771 A * | 10/2014 |
| WO | 98/02480 A1 | 1/1998 |
| WO | 99/02590 A1 | 1/1999 |
| WO | 2007/121936 A1 | 11/2007 |
| WO | 2008/055683 A1 | 5/2008 |
| WO | 2009/138460 A1 | 11/2009 |
| WO | 2014/095925 A1 | 6/2014 |
| WO | 2014/202481 A1 | 12/2014 |
| WO | 2015/165918 A1 | 11/2015 |

OTHER PUBLICATIONS

JP2016145294A English Machine Translation, prepared May 21, 2021. (Year: 2021).*
KR20140120771A English Machine Translation, prepared May 21, 2021. (Year: 2021).*
N.E. Kamber, et al., "Organocatalytic Ring-Opening Polymerization", Chem. Rev., 107, pp. 5813-5840 (2007).
M.K. Kiesewetter, et al., "Cyclic Guanidine Organic Catalysts: What Is Magic About Triazabicyclodecene?", J. Org. Chem., 74, pp. 9490-9496 (2009).
S. Naumann, et al., "Highly Polarized Alkenes as Organocatalysts for the Polymerization of Lactones and Trimethylene Carbonate", ACS Macro Letters, 5, pp. 134-138 (2016).
D.N. Schulz, et al., "Anionic Polymerization Initiators Containing Protected Functional Groups. II*", Journal of Polymer Science: Polymer Chemistry Edition, 15, pp. 2401-2410 (1977).

(Continued)

*Primary Examiner* — Christopher M Rodd
(74) *Attorney, Agent, or Firm* — Venable LLP

(57) ABSTRACT

The present invention relates to a process for preparing a diene elastomer/polylactide copolymer, the weight percentage of polylactide being between 10% and 45% by weight, relative to the weight of the copolymer, characterized in that lactide, an elastomer functionalized by at least one group bearing at least one function capable of initiating a ring-opening polymerization of the lactide and a catalytic system are introduced into an extruder (A).

19 Claims, 2 Drawing Sheets

(56) References Cited

OTHER PUBLICATIONS

International Search Report and Written Opinion in corresponding PCT Application No. PCT/FR2017/053796 (21 pages).

* cited by examiner

PROCESS FOR PREPARING POLYDIENE/POLYLACTIDE COPOLYMERS BY REACTIVE EXTRUSION

BACKGROUND

The present invention relates to a process for preparing polydiene/polylactide copolymers by reactive extrusion.

Various strategies are possible in order to modify the properties of the synthetic elastomers contained in rubber compositions for tyres. Among said strategies, one of the methods employed is the reaction of diene elastomers with other polymers.

The inventors are interested more particularly, in the context of the invention, in the preparation of triblock or comb block copolymers combining an elastomer backbone and rigid blocks that are pendant or at the ends. These copolymers thus have thermoplastic elastomer properties. The invention is in particular directed towards triblock or comb block copolymers which can be used as material as such.

Materials with thermoplastic elastomer properties combine the elastic properties of elastomers and the thermoplastic nature, namely the ability to reversibly melt and harden, under the reaction of heat, of blocks that are pendant or at the ends.

In the context of the invention, for the thermoplastic block, thermoplastic polymers are sought which have a melting point greater than or equal to 100° C., advantageously ranging from 100° C. to 230° C.

Polylactic acid, PLA, has a melting point which falls within this range.

Application JP 2012 158 738 describes compositions for tyres comprising a diene elastomer grafted with polylactic acid, PLA. The copolymer is obtained by reaction of the diene elastomer polymer and of the PLA polymer. It is noted, moreover, that the PLA content in the copolymer can only be low: at most 10 parts by weight per 100 parts of the diene elastomer.

Application JP 5152804 describes the free-radical grafting of a PLA polymer onto a diene elastomer in a biaxial extruder. However, such free-radical grafting is not very controlled and also results in the creation of bonds between the diene elastomer chains.

In addition, PLA chains which have not reacted with the diene elastomer may remain in the composition obtained.

In the context of the invention, a flexible inexpensive process is sought which makes it possible to obtain a copolymer which has a controlled structure and which has thermoplastic elastomer properties. Reactive extrusion is a process that is especially used for thermoplastics, and therefore polymers having high glass transition temperatures or melting points, as appropriate. Reactive extrusion makes it possible to work without solvent. In addition, reactive extrusion makes it possible to carry out all the steps (mixing, polymerization and purification/devolatilization) in one and the same reactor, the extruder.

The preparation of polylactic acid by reactive extrusion has already been described in WO98/02480.

Applications WO2014/202481 and WO2015/165918 describe compositions comprising polylactic acid copolymers that can comprise up to 52% by weight of polybutadiene. These copolymers are not elastomers. In particular, in these copolymers, the butadiene block has a number-average molar mass of less than 40 000 g/mol.

In the context of the invention, the term "lactide" is intended to mean the cyclic diester of lactic acid, that is to say of 2-hydroxypropionic acid. The lactide corresponds to the following formula:

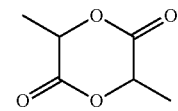

The term "lactide" covers all the possible stereoisomeric configurations of lactide: (R,R)-lactide, (S,S)-lactide and meso-lactide.

In the context of the invention, the term "polylactic acid" or "PLA" or "polylactide" is intended to mean the polymer obtained by ring-opening polymerization of lactide. The repeating unit of PLA can be represented by the formula $-[CH(CH_3)-C(O)-O]_n-$, it being possible for the asymmetric carbon to be in the R or S configuration.

In the present description, the expression "along the backbone" when referring to a pendant PLA block of the copolymer should be understood to mean that the copolymer comprises pendant groups of this type in several places on the elastomer chain constituting the backbone. This includes the end(s) of the chain, but is not limited to these positions. When a block is present at at least one chain end, the copolymer advantageously also comprises at least one other pendant block of this type in another position in the chain.

In the present description, the terms "functionalized" and "functional" will be used without distinction. The molar masses are determined by the methods described in the "measurements and tests used" part, according to the size exclusion chromatography (SEC) method in polystyrene equivalent. In the present description, unless expressly otherwise indicated, all the molar masses are number-average molar masses.

In the present description, unless expressly otherwise indicated, all the percentages (%) indicated are weight percentages.

In the present description, any range of values denoted by the expression "between a and b" represents the range of values of from more than a to less than b (that is to say limits a and b excluded), while any range of values denoted by the expression "from a to b" means the range of values of from a up to b (that is to say including the strict limits a and b).

The compounds mentioned in the description and which are part of the preparation of rubber compositions or polymers may be of fossil or biobased origin. In the latter case, they may be partially or totally derived from biomass or obtained from renewable raw materials derived from biomass. Those in question are in particular polymers, plasticizing agents, fillers, etc.

SUMMARY

A subject of the present invention is a process for preparing a diene elastomer/polylactide copolymer, the weight percentage of polylactide being between 10% and 45% by weight, relative to the weight of the copolymer, characterized in that the following are introduced into an extruder:
lactide;
an elastomer functionalized by at least one group bearing at least one function capable of initiating a ring-opening polymerization of the lactide, said functionalized elastomer having a number-average molar mass, Mn, of greater than 40 000 g/mol; and
a catalytic system.

DETAILED DESCRIPTION

Figure 1:
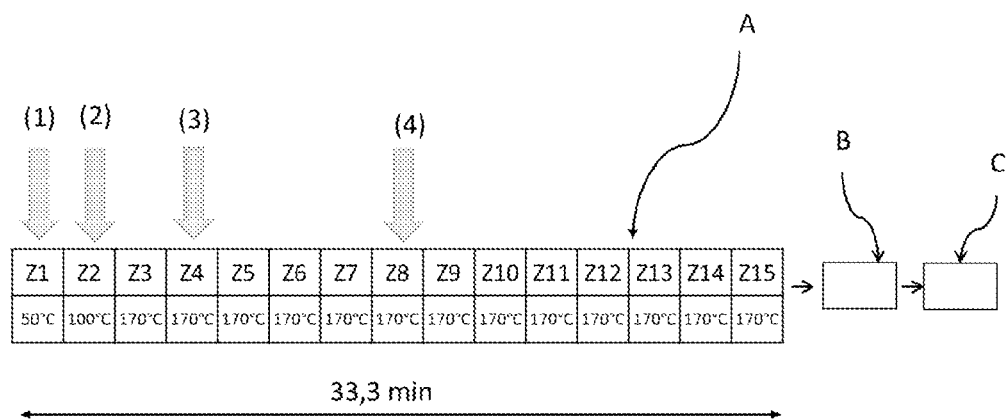
FIG. 1 represents an exemplary embodiment of a continuous process for the synthesis of a copolymer according to the invention, for example, a styrene-butadiene (SBR)/PLA copolymer.

The process according to the invention makes it possible to prepare a diene elastomer/polylactide copolymer which retains its elastomeric properties. The process according to the invention makes it possible in particular to prepare a diene/polylactide copolymer, in particular the triblock or the comb copolymer having an elongation at break of at least 150%, as measured by the method described before the examples, "mechanical tests" paragraph.

During the reactive extrusion, the lactide reacts with the reactive function(s) borne by the group of the functionalized elastomer and then the lactide polymerizes, by ring-opening, so as to form one or more polylactide (PLA) block(s).

The groups may be pendant along the backbone or at the end. In particular, in one embodiment, the diene elastomer is functionalized by two end groups, each group bearing at least one function capable of initiating a ring-opening polymerization of the lactide. The diene elastomer/polylactide copolymer that will thus be obtained in the case of 2 end groups bearing a single function will be a PLA-diene elastomer-PLA triblock.

In another embodiment, the diene elastomer is functionalized by several pendant groups, each group bearing at least one function capable of initiating a ring-opening polymerization of the lactide. These groups are pendant along the backbone and thus at least one of these pendant groups is not at the end. The diene elastomer/polylactide copolymer that will thus be obtained will be a comb copolymer having a diene elastomer backbone and pendant PLA blocks along the backbone.

In another embodiment, the diene elastomer is functionalized by an end group bearing at least one function capable of initiating a ring-opening polymerization of the lactide. The diene elastomer/polylactide copolymer that will thus be obtained in the case of the end group bearing a single function will be a PLA-diene elastomer diblock.

This process thus allows a controlled polymerization, by growth of a PLA chain from each initiator function borne by each pendant or end group of the diene elastomer. In said group, the function capable of initiating a ring-opening polymerization of the lactide, also referred to as initiator function, is advantageously at the end.

Advantageously, the elastomer is functionalized by at least two groups, which may be identical or different, each bearing at least one function capable of initiating a ring-opening polymerization of the lactide, thus resulting in triblock or comb diene elastomer/polylactide copolymers.

The diene elastomer functionalized by at least two groups can in particular be represented by the following formulae:

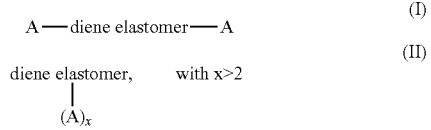

(I)
(II)

In these two formulae (I), (II), the A group is a group bearing at least one function capable of initiating a ring-opening polymerization of the lactide. The A group may be different in one and the same formula and from a formula (I) to a formula (II).

As set out above, the elastomers of formula (I) will result in triblocks, whereas the elastomers of formula (II) will result in comb copolymers.

Advantageously, the process comprises the following successive steps:
a. introduction of the lactide and of said functionalized elastomer into an extruder;
b. mixing of the components introduced in step a); then
c. introduction of the catalytic system into the mixture obtained following step b), the introduction of the catalytic system triggering the polymerization; then
d. introduction of a catalysis inhibitor in order to stop the polymerization;
e. recovery of the diene elastomer/polylactide copolymer at the outlet of the extruder.

Steps a) and b) make it possible to homogenize the mixture and to ensure that the subsequent polymerization takes place optimally. Advantageously, during step a), all of the functionalized elastomer is introduced.

As the lactide is sensitive to water and to moisture, the functionalized elastomer is advantageously dried beforehand. Advantageously, the residual water content in the diene elastomer is less than 2000 ppm, more advantageously less than 1000 ppm. Advantageously, the residual water content in the lactide is less than 500 ppm, more advantageously less than 300 ppm.

In addition, steps a) and b) are advantageously carried out under anhydrous conditions, for example under flushing with an inert gas such as nitrogen, in order to avoid any homopolymerization of the lactide.

During step a), all of the lactide or a portion of the lactide can be introduced.

In a first embodiment, during step a), all of the lactide is introduced.

In a second embodiment, during step a), a portion of the lactide, advantageously at least 50% by weight, relative to the total amount of lactide, more advantageously at least 70% by weight, is introduced.

The remaining portion of the lactide will be added during step c), prior to or simultaneously with the introduction of the catalytic system.

Advantageously, the process comprises the following successive steps:
a. introduction of a portion of the lactide and of said functionalized elastomer into an extruder;
b. mixing of the components introduced in step a); then
c. introduction of the remaining portion of the lactide and of the catalytic system into the mixture obtained following step b), the introduction of the catalytic system triggering the polymerization; then
d. introduction of a catalysis inhibitor in order to stop the polymerization;
e. recovery of the diene elastomer/polylactide copolymer at the outlet of the extruder.

The polymerization of the lactide begins when the catalytic system is added. It is, of course, understood that the catalytic system comprises a catalyst which enables the ring-opening polymerization of the lactide, which catalyst will be subsequently described.

The polymerization is advantageously carried out at a temperature ranging from 80° C. to 200° C., more advantageously ranging from 100° C. to 200° C., even more advantageously ranging from 150° C. to 200° C.

The process is characterized in that the polymerization is carried out in an extruder. Any type of extruder which allows the mixing of components can be used: single-screw, two-stage or co-kneader, twin-screw, planetary gear, ring extruder. Twin-screw extruders are particularly suitable. The extruder can allow a continuous or batchwise process.

For one type of process, continuous or batchwise, the L/D (length/diameter) ratio of the extruder is adapted to the polymerization time, which is dependent on the flow rate and on the residence time. In a continuous process, the L/D ratio may, for example, be greater than 20, more advantageously greater than 40. It may, for example, be 56 for a continuous twin-screw extruder and a polymerization time of less than 30 minutes. In a batchwise process, it may for example be 5 or 6 for a micro-extruder and a polymerization time of less than 30 minutes.

In the advantageous embodiment implementing steps a) to e), these steps a) to e) are advantageously carried out in one and the same extruder, mainly for practical reasons. However, the use of one extruder for steps a) and b) and another extruder for steps c) to e) could be envisaged.

The mixing in steps a) and b) is advantageously carried out with weaker mixing than the mixing in the polymerization step c), in particular so as not to degrade the functionalized diene elastomer during steps a) and b). Those skilled in the art know how to adjust the rotational speed of the screws of the extruder, its design in the mixing zones as a function of the mixing that they wish to obtain.

An inhibitor of the catalytic system is introduced during step d), of course after mixing in the preceding step for a period of time sufficient to reach the desired degree of polymerization.

During step e), before recovery of the copolymer at the outlet, the process according to the invention may comprise a step of evaporating off the unreacted volatile components, in particular the lactide that has not reacted.

The process according to the invention makes it possible to obtain satisfactory conversions in times periods compatible with industrial use. In particular, the polymerization time is advantageously less than 30 minutes, more advantageously it ranges from 5 minutes to less than 30 minutes.

In the process according to the invention, an antioxidant which makes it possible to prevent degradation of the diene elastomer can also be introduced, advantageously as early as step a). This antioxidant may also make it possible to prevent depolymerization of the PLA blocks or of the couplings between the diene elastomer/polylactide copolymer chains formed. The antioxidant is described below.

The polymerization is advantageously carried out in bulk, that is to say without adding additional solvent. The process may be continuous or batchwise.

In a first embodiment, the process is continuous. Steps a) to e) will thus be simultaneous and will take place in different zones of the extruder. For example, step a) will be carried out in a feed zone (located upstream in the extruder), then step b) will be carried out in a mixing zone. Even further downstream, the extruder will comprise a zone for introducing the catalytic system, then a mixing zone. Even further downstream, the extruder will comprise a zone for introducing the inhibitor of the catalytic system, for mixing, then for evaporating off the unreacted volatile products with exiting and recovery of the copolymer.

It is understood that upstream lies in the extruder head (feed zone). Relative to a reference point, a downstream zone is a zone closer to the outlet of the extruder.

An exemplary embodiment of a continuous process for the synthesis of a copolymer according to the invention, for example a styrene-butadiene (SBR)/PLA copolymer, is represented in FIG. 1. In a twin-screw extruder A comprising 15 mixing zones (Z1 to Z15, having the setpoint temperature indicated), having an L/D ratio of 56, the lactide 1 (40% by weight relative to the total weight of lactide+difunctionalized SBR) is introduced under a nitrogen atmosphere at a suitable flow rate, for example from 400 g/h, into the zone Z1, then a difunctionalized elastomer, for example a primary aromatic amine-difunctionalized SBR, having a number-average molar mass of 87 300 g/mol, is introduced, under a nitrogen atmosphere at a suitable flow rate, for example of 600 g/h, into the zone Z2. The lactide and the functionalized elastomer are mixed for a sufficient period of time, for example of 2.1 minutes. In the zone Z4, the catalytic system 3 in the form of a solution is added at a suitable flow rate, for example of 0.136 ml/min. The catalytic system may for example be a 1/1 mol/mol mixture of $Sn(oct)_2$ and of $P(Ph)_3$ and the lactide/$Sn(oct)_2$ molar ratio is for example 700. The polymerization begins at this moment. In zone Z8, a catalyst inhibitor 4 is introduced in order to stop the polymerization. The unreacted lactide is evaporated off under vacuum in the zones Z10 to Z12. The rotational speed of the screws is for example 70 rpm. In the embodiment exemplified, the total flow rate is 1000 g/h. At the extruder outlet, the extrudate is sent to a cooling bed B and then to a granulator C.

The copolymer obtained has a linear triblock structure with a central elastomer block of 87 300 g/mol bonded to two lateral blocks of PLA having a molar mass of approximately 10 000 g/mol, i.e. a molar mass of the triblock of approximately 110 000 g/mol. The conversion of the lactide into PLA is greater than 90% and the majority of the residual lactide is eliminated during step e).

In a second embodiment, the process is batchwise. Steps a) to e) will thus be spread out over time and may take place in one and the same zone of the extruder.

Steps a) to e) may thus be carried out in cycles, the product exiting from the extrusion zone being sent back as feed for the extruder. Step a) corresponds to the beginning of the first cycle. Then step b) is carried out for a predetermined number of cycles. During step c), the catalytic system is introduced and then the predetermined number of cycles is carried out. During step d), the inhibitor of the catalytic system is introduced and then the predetermined number of cycles is carried out in order to evaporate off the unreacted products before exiting and recovery of the copolymer.

In the diene elastomer/polylactide copolymer, the weight percentage of polylactide is between 10% and 45% by weight, advantageously up to 40% by weight, more advantageously from 15% to 40% by weight.

In order to reach such ratios in the copolymer, the weight percentage of lactide introduced advantageously ranges from 12% to 47% by weight, relative to the total weight of functionalized diene elastomer introduced and of lactide introduced.

Catalytic System:

The reaction for ring-opening polymerization of the lactide is carried out in the presence of a catalytic system, as known to those skilled in the art.

A first example of a suitable catalytic system is that described in patent application WO98/02480.

This catalytic system comprises at least one catalyst and optionally at least one co-catalyst.

Preferably, the catalyst is of formula (M) $(X^1, X^2 \ldots X^m)_n$ in which

M is a metal selected from the metals of groups 2, 4, 8, 9, 10, 12, 13, 14 and 15 of the periodic table of elements;

$X^1, X^2 \ldots X^m$ is a substituent selected from alkyl, aryl, oxide, carboxylate, halide, alkoxy and alkyl ester groups;

m is an integer between 1 and 6, and n is an integer between 1 and 6, the values of m and n depending on the degree of oxidation of the metal ion.

The term "alkyl" denotes a linear or branched saturated hydrocarbon-based group having from 1 to 20 carbon atoms, in particular from 1 to 16 carbon atoms, in particular from 1 to 12 carbon atoms, in particular from 1 to 10 carbon atoms and more particularly from 1 to 6 carbon atoms. By way of example, included in this definition are radicals such as methyl, ethyl, isopropyl, n-butyl, t-butyl, t-butylmethyl, n-propyl, pentyl, n-hexyl, 2-ethylbutyl, heptyl, octyl, nonyl or decyl.

The term "aryl" denotes an aromatic ring comprising from 1 to 3 aromatic nuclei, which are optionally condensed, having from 6 to 20 carbon atoms, in particular from 6 to 10 carbon atoms. By way of example of aryl groups, mention may be made of phenyl, phenethyl, naphthyl or anthryl.

The term "alkoxy" denotes a group of general formula R—O— where R is an alkyl group as defined above. By way of example, mention may be made of methoxy, ethoxy, propoxy, t-butoxy, n-butoxy, isobutoxy, sec-butoxy, n-pentoxy, isopentoxy, sec-pentoxy, t-pentoxy, hexyloxy and isopropoxy groups.

The term "halide" denotes a chloride, a fluoride, an iodide or a bromide.

In group 2, the use of Mg and Ca is preferred. In group 4, the use of Ti, Zr and Hf may be mentioned. Within group 8, the use of Fe is preferred. Within group 12, the use of Zn is preferred. Within group 13, the use of Al, Ga, In and Tl may be mentioned. Within group 14, the use of Sn is preferred. Within group 15, the use of Sb and Bi is preferred. In general, the use of metals of groups 4, 14 and 15 is preferred. It is preferable for M to be selected from Sn, Zr, Hf, Zn, Bi and Ti. The use of an Sn-based catalyst may be particularly preferred.

For the halides, tin halides such as $SnCl_2$, $SnBr_2$, $SnCl$ and $SnBr_4$ may be mentioned. For the oxides, SnO and PbO may be mentioned. In the group of alkyl esters, octoates (for example, 2-ethylhexanoate), stearates and acetates may be mentioned. In particular Sn octanoate (also known as Sn(II) bis(2-ethylhexanoate) or simply as tin octoate), tin stearate, dibutyltin diacetate, butyltin tris(2-ethylhexanoate), tin (2-ethylhexanoate), bismuth (2-ethylhexanoate), tin triacetate, sodium (2-ethylhexanoate), calcium stearate, magnesium stearate and zinc stearate may be mentioned. Mention may also be made of $Ti(OiPr)_4$, $Ti(2$-ethylhexanoate$)_4$, $Ti(2$-ethylhexylate$)_4$, $Zr(OiPr)_4$, $Bi(neodecanoate)_3$ or Zn (lactate)$_2$. Other suitable compounds include tetraphenyltin, Sb tris(ethylene glycolate), alkoxy aluminiums and alkoxy zincs.

The catalytic system may also comprise a co-catalyst, advantageously of formula

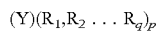

(Y)(R$_1$,R$_2$ ... R$_q$)$_p$ where

Y is an element selected from the elements of group 15 and/or 16 of the periodic table, R$_1$, R$_2$ ... R$_q$ is a substituent selected from the group comprising alkyls, aryls, oxides, halides, alkoxys, aminoalkyls, thioalkyls, phenyloxys, aminoaryls, thioaryls, and compounds containing the elements of group 15 and/or 16 of the periodic table, q is an integer between 1 and 6, and p is an integer between 1 and 6.

Preferentially, the catalytic system comprises tin bis(2-ethylhexanoate) as catalyst and triphenylphosphine PPh$_3$ as co-catalyst. The molar ratio between the co-catalyst and the catalyst may be between 1/10 and 10/1, preferentially between 1/3 and 3/1. More preferentially, the molar ratio between the co-catalyst and the catalyst may be 1/1.

The molar ratio between the lactide and the catalyst may be less than 1000/1, in particular less than 900/1.

The molar ratio between the lactide and the tin bis(2-ethylhexanoate) catalyst may range from 50/1 to 1000/1, preferentially from 100/1 to 900/1, more preferentially from 200/1 to 800/1.

When another catalyst is used, those skilled in the art know to adjust the amounts thereof and the temperature in order to adhere to the same catalytic activity.

Other catalytic systems may also be used and reference may in particular be made to the article Kamber et al. (Organocatalytic ring-opening polymerization, Nahrain E. Kamber et al., Chem. Rev. 2007, 107,5813-5840).

Mention may also be made of the organic catalysts of the family of guanidines, in particular TBD: 1,5,7-triazabicyclo [4.4.0]dec-5-ene) (Cyclic guanidine organic catalysts; what is magic about triazabicyclodecene?, Matthew K. Kiesewetter et al., J. Org. Chem., 2009, 74, 6490-9496) or N-heterocyclic olefins (Highly polarised alkenes as organocatalysts for the polymerization of lactones and trimethylene carbonate, stefen naumann et al., ACS Macro Lett., 2016, 5, 134-138).

Antioxidant and Polymerization Inhibitor:

In the process according to the invention, an antioxidant may be added as early as step a).

This antioxidant is preferably not very nucleophilic so as not to initiate the ring-opening polymerization of the lactide.

Antioxidants of PLA are in particular described in patents U.S. Pat. No. 6,143,863 or EP 912 624. Organophosphites such as bis(2,4-di-t-butylphenyl)pentaerythritol diphosphite (trade name: Ultranox® 626) are particularly efficient. Hindered phenolic antioxidants such as Irganox® 1070 are also particularly efficient.

The polymerization inhibitor (cata-killer) added during step d) of the process may also have an antioxidant effect.

The inhibitors of the catalyst system used in the process of the invention are known to those skilled in the art. Reference may for example be made to patent U.S. Pat. No. 6,114,495, or EP 912 624. Mention may in particular be made of the following commercial products: Irganox® 1425 or Irganox® 195, which are both phosphonates, Doverphos® S680 or Doverphos® LP09, which are both phosphites, polyacrylic acid and tartaric acid.

Finally, the functionalized elastomer introduced may comprise an antioxidant that was introduced at the end of the synthesis of the functionalized elastomer. The antioxidant added at the end of synthesis of the functionalized elastomer is any antioxidant known to be effective in preventing elastomer ageing attributable to the action of oxygen.

Mention may in particular be made of para-phenylenediamine (abbreviated to "PPD" or "PPDA") derivatives, also known as substituted para-phenylenediamines, such as for example N-1,3-dimethylbutyl-N'-phenyl-p-phenylenediamine (more well known under the abbreviated term "6-PPD"), N-isopropyl-N'-phenyl-p-phenylenediamine (abbreviated to "I-PPD"), phenylcyclohexyl-p-phenylenediamine, N,N'-di(1,4-dimethylpentyl)-p-phenylenediamine, N,N'-diaryl-p-phenylenediamine ("DTPD"), diaryl-p-phenylenediamine ("DAPD"), 2,4,6-tris(N-1,4-dimethylpentyl-p-phenylenediamino)-1,3,5-triazine, and mixtures of such diamines.

Mention may also be made of substituted diphenylamines or triphenylamines, as described for example in applications WO 2007/121936, WO 2008/055683 and WO2009/138460, in particular 4,4'-bis(isopropylamino)triphenylamine, 4,4'-bis(1,3-dimethylbutylamino)triphenylamine, 4,4'-bis(1,4-dimethylpentylamino)triphenylamine, 4,4',4"-tris(1,3-dimethylbutylamino)triphenylamine or 4,4',4"-tris(1,4-dimethylpentylamino)-triphenylamine.

Mention may also be made of dialkyl thiodipropionates or else phenolic antioxidants, in particular of the 2,2'-methylenebis[4-($C_1$-$C_{10}$)alkyl-6-($C_1$-$C_{12}$)alkyl)phenol family, as described in particular in application WO 99/02590.

Preferably, the antioxidant is selected from the group consisting of substituted p-phenylenediamines, substituted diphenylamines, substituted triphenylamines, and mixtures of such compounds; even more preferentially, the antioxidant is selected from the group consisting of substituted p-phenylenediamines and mixtures of such diamines.

Of course, in the present description, the term "antioxidant" can denote both a single antioxidant compound or a mixture of several antioxidant compounds.

The process according to the invention uses at least one functionalized diene elastomer.

The diene elastomers before functionalization will firstly be described, followed by at least one process adapted to functionalize these elastomers.

Diene elastomer, before functionalization:

The term "diene elastomer" should be understood to mean according to the invention any polymer derived at least partly (i.e. a homopolymer or a copolymer) from diene monomers (monomers bearing two conjugated or non-conjugated carbon-carbon double bonds). The expression "diene elastomer that can be used in the invention" is intended to mean more particularly a diene elastomer corresponding to one of the following categories:

(a) any homopolymer obtained by polymerization of at a conjugated diene monomer having from 4 to 12 carbon atoms;

(b) any copolymer obtained by copolymerization of one or more of the conjugated dienes having from 4 to 12 carbon atoms, such as those mentioned below, with one another or with one or more ethylenically unsaturated monomers;

(c) any homopolymer obtained by polymerization of a non-conjugated diene monomer having from 5 to 12 carbon atoms;

(d) any copolymer obtained by copolymerization of one or more of the non-conjugated dienes having from 5 to 12 carbon atoms, such as those mentioned below, with one another or with one or more ethylenically unsaturated monomers, (e) natural rubber;

(f) a mixture of several of the elastomers defined in (a) to (f) with one another.

By way of conjugated diene monomer suitable for the synthesis of the elastomers, mention may be made of 1,3-butadiene (hereinafter denoted butadiene), 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

By way of nonconjugated diene monomer suitable for the elastomer synthesis, mention may be made of 1,4-pentadiene, 1,4-hexadiene, ethylidene norbornene and dicyclopentadiene;

By way of ethylenically unsaturated monomers that may be involved in the copolymerization with one or more conjugated or non-conjugated diene monomers, for synthesizing the elastomers, mention may be made of:

vinylaromatic compounds having from 8 to 20 carbon atoms, such as for example styrene, ortho-, meta-, para-methylstyrene, the vinylmesitylene commercial mixture, divinylbenzene, vinylnaphthalene;

(non-aromatic) monoolefins such as, for example, ethylene and alpha-olefins, in particular propylene, isobutene;

(meth)acrylonitrile, (meth)acrylic esters.

Among these, the diene polymer(s) used in the invention are most particularly selected from the group of diene polymers, consisting of polybutadienes (abbreviated to "BR"), synthetic polyisoprenes (IR), natural rubber (NR), butadiene copolymers, isoprene copolymers, ethylene/diene copolymers, and blends of these polymers. Such copolymers are more preferentially selected from the group consisting of butadiene/styrene (SBR) copolymers, isoprene/butadiene (BIR) copolymers, isoprene-styrene (SIR) copolymers, isoprene/butadiene/styrene (SBIR) copolymers, halogenated or non-halogenated butyl rubbers, and ethylene/butadiene (EBR) copolymers.

Functionalizaton Processes:

Functions capable of initiating polymerization by ring opening of the lactide are more particularly hydroxyl —OH or primary amine —$NH_2$ functions.

The diene elastomers functionalized by one or two end group(s) (third and first advantageous embodiments of the invention) can be prepared by various processes known to those skilled in the art, in particular by functional initiation, by termination reaction with a functionalizing agent or by coupling.

A process for preparing a diene elastomer functionalized by one or two amine end group(s) is for example described in the publication Schulz et al., Journal of Polymer Science, vol. 15, 2401-2410 (1977).

The diene elastomer functionalized by several pendant groups (second advantageous embodiment of the invention) can be prepared by various processes known to those skilled in the art, in particular by grafting.

The diene elastomer functionalized by nucleophilic groups along the main chain can be functionalized during a step of functionalization of the main chain of the elastomer by various techniques, for example by free-radical reaction, by hydrosilylation, or by oxidation of the unsaturation followed by a hydrogenation. This functionalization makes it possible to obtain a polymer functionalized by nucleophilic groups, advantageously primary amine or alcohol groups.

In particular, the diene elastomer can be functionalized by free-radical reaction according to the process described in application WO 2014/095925.

Functionalized Diene Elastomer:

The number-average molar mass, Mn, of the functionalized diene elastomer is greater than 40 000 g/mol.

In a first advantageous embodiment of the invention, the diene elastomer is functionalized by two end groups.

The number-average molar mass, Mn, of the diene elastomer advantageously ranges from more than 40 000 g/mol to 250 000 g/mol, more advantageously from 50 000 g/mol to 200 000 g/mol In a second advantageous embodiment of the invention, the diene elastomer is functionalized by several pendant groups distributed along the backbone, at least one of which is not at the end.

The number-average molar mass, Mn, of the diene elastomer advantageously ranges from 100 000 g/mol to 500 000 g/mol.

In a third advantageous embodiment of the invention, the diene elastomer is functionalized by an end group.

The number-average molar mass, Mn, of the diene elastomer advantageously ranges from more than 40 000 g/mol to 150 000 g/mol.

Copolymers Obtained by the Process According to the Invention:

The copolymers obtained by the process according to the invention have properties of a thermoplastic elastomer, namely elastic properties and a capacity of the rigid blocks to reversibly melt and harden under the action of heat.

In the diene elastomer/polylactide copolymer, the weight percentage of polylactide is between 10% and 45% by weight, advantageously up to 40% by weight, even more advantageously from 15% to 40% by weight.

It has been noted that, when the weight percentage of polylactide in the copolymer is greater than 50% by weight, or even greater than 45% by weight, the copolymer obtained no longer exhibits an elastomeric nature.

In a first advantageous embodiment of the invention, the diene elastomer/polylactide copolymer obtained is a triblock, of PLA-diene elastomer-PLA structure, having a number-average molar mass, Mn, ranging from 50 000 g/mol to 300 000 g/mol.

In a second advantageous embodiment of the invention, the diene elastomer/polylactide copolymer obtained is a comb polymer having a diene elastomer backbone and pendant PLA blocks distributed along the backbone, having a number-average molar mass, Mn, ranging from 100 000 g/mol to 600 000 g/mol.

In a third embodiment of the invention, the diene elastomer/polylactide copolymer obtained is a diblock having a number-average molar mass, Mn, ranging from 50 000 g/mol to 200 000 g/mol.

In one or other of these embodiments, the melting point of the PLA block advantageously ranges from 100° C. to 230° C., more advantageously from 150° C. to 210° C.

The copolymers obtained by the process according to the invention, in particular the triblock or the comb copolymer, withstand large strains before breaking, but can flow at a temperature above the melting point of the PLA block(s).

In particular, the copolymer according to the invention, in particular triblock or the comb copolymer, has an elongation at break of at least 150% as measured by the method described before the examples, "mechanical tests" paragraph.

When the copolymers obtained by the process according to the invention, in particular the triblock or the comb copolymer, are studied by dynamic mechanical analysis, the presence of a rubbery plateau is observed over a broad temperature range, ranging from −20° C. to 90° C. for the copolymers exemplified.

The copolymer can be used in a composition; the composition is advantageously a rubber composition, in particular a composition that can be used in the manufacture of a tyre. The copolymer according to the invention is particularly useful for preparing compositions for treads. The copolymer according to the invention makes it possible to manufacture a tread which makes it possible to obtain a very good compromise between grip and rolling resistance.

Measurements and Tests Used

1. Determination of the Molar Mass Distribution a. Molar Mass of the Diene Elastomer The molar masses are determined by size exclusion chromatography (SEC) in polystyrene equivalent.

i) Principle of the measurement:

SEC makes it possible to separate macromolecules in solution according to their size through columns filled with a porous gel. The macromolecules are separated according to their hydrodynamic volume, the most voluminous being eluted first. Without being an absolute method, SEC makes it possible to understand the molar mass distribution of a polymer. On the basis of commercial standard products, the various number-average (Mn) and weight-average (Mw) molar masses can be determined and the polydispersity index (PI=Mw/Mn) can be calculated via a "MOORE" calibration.

ii) Preparation of the Polymer:

There is no particular treatment of the polymer sample before analysis. Said polymer sample is simply dissolved in chloroform, at a concentration of approximately 2 g/l. The solution is then filtered through a filter with a porosity of 0.45 μm before injection.

iii) SEC Analysis:

The equipment used is an Agilent 1200 chromatograph. The elution solvent is chloroform. The flow rate is 0.7 ml/min, the temperature of the system is 35° C. and the analysis time is 90 min. A set of four Waters columns in series, having the trade names Styragel HMW7, Styragel HMW6E and two Styragel HT6E, is used. The injected volume of the solution of the polymer sample is 100 μl. The detector is a differential refractometer is a Waters 2010 and the chromatographic data exploitation software is the "Waters Empower" system. The calculated average molar masses are relative to a calibration curve produced using "PSS ReadyCal Kit" commercial polystyrene standards.

b. Molar Mass of the Diene Elastomer/Polylactide Copolymer

It is determined by size exclusion chromatography (SEC) in polystyrene equivalent. SEC makes it possible to separate macromolecules in solution according to their size through columns filled with a porous gel. The macromolecules are separated according to the hydrodynamic volume, the most voluminous being eluted first. Without being an absolute method, SEC makes it possible to understand the molar mass distribution of a polymer. Using commercial standard products, the various number-average (Mn) and weight-average (Mw) molar masses can be determined and the polydispersity index (PI=Mw/Mn) can be calculated via "MOORE" calibration.

Preparation of the polymer: There is no particular treatment of the polymer sample before analysis. Said polymer sample is simply dissolved in chloroform, at a concentration of approximately 2 g/l. The solution is then filtered through a filter with a porosity of 0.45 μm before injection.

SEC analysis: The equipment used is an Agilent 1200 chromatograph. The elution solvent is chloroform. The flow rate is 1 ml/min, the temperature of the system is 30° C. and the analysis time is 30 min. A set of three Agilent columns in series preceded by a filter, having the trade names "PLgel 10 μm (precolumn)" and two "PLgel 10 μm mixed B", is used. The injected volume of the solution of the polymer sample is 100 μl. The detector is an Agilent 1200 differential refractometer and the chromatographic data exploitation software is the Chemstation system. The calculated average molar masses are relative to a calibration curve produced from Agilent-KIT PS commercial polystyrene standards.

2. Determination of the Conversion and of the Composition of the SBR/PLA Block Copolymers by NMR The determinations of the amounts of PLA in the triblock or comb copolymers and the microstructures of the diene elastomers within the copolymer are determined by an NMR analysis.

The samples (approximately 20 mg) are dissolved in 1 ml of $CDCl_3$ and introduced into a 5 mm NMR tube. The spectra are recorded on a Bruker Avance III HD 500 MHz spectrometer equipped with a BBFO 1H-X 5 mm Z_GRD probe. The spectra are calibrated on the signal of the $CDCl_3$ at 7.20 ppm in $^1H$ mode.

The quantitative $^1H$ NMR experiment used is a simple pulse sequence with a tilt angle at 30° and a recycle delay of 5 seconds between each acquisition. 64 accumulations are recorded at ambient temperature. The spectra are calibrated on the signal of the $CDCl_3$ at 7.20 ppm in 1H mode.

The signals of the SBR, and also those of the PLA, are observed and will be used for the quantification:

CH of the PLA at $\delta^1H=5.1$ ppm and $\delta^{13}C=68.8$ ppm
$CH_3$ of the PLA at $\delta^1H=1.51$ ppm and $\delta^{13}C=16.5$ ppm 3. DSC (Differential Scanning Calorimetry)

The melting points, enthalpies of fusion and glass transition temperatures Tg of the polymers are measured by means of a differential scanning calorimeter. The copolymers or the SBR/PLA blend (control) obtained were analysed by DSC on a TA Instruments DSC Q200 instrument under the following operating conditions: $1^{st}$ heating from 20° C. to 200° C. (10° C./min), cooling 200° C. to −70° C. (10° C./min), $2^{nd}$ heating from −70° C. to 200° C. (10° C./min).

4. Mechanical Tests a. Tensile Experiments

The tensile strength (MPa) and the elongation at break (%) are measured by means of tensile tests according to the international standard ASTM D638 (year 2002). All these tensile measurements are carried out under normal conditions of temperature (23±2° C.) and hygrometry (50±5% relative humidity), according to the international standard ASTM D638 (year 2002). The measurements are carried out on test specimens of type V at a pull speed of 50 mm/min on a Lloyd LR 10k machine. The strain is measured by following the displacement of the crosshead.

b. Dynamic Mechanical Analysis (DMA)

The linear viscoelastic properties of these materials are measured by sinusoidal elongation of low strain (0.1%). The measurements are carried out on a dynamic mechanical analyzer (DMA) from TA Instruments (DMA800) at strain applied to rectangular-shaped test specimens having the dimensions (mm): 25×5×0.5. The samples are moulded at 183° C. for 5 minutes, then cut up with a hole punch. The elastic storage modulus E', the viscous modulus E" and the tan δ loss factor are measured during a temperature sweep of −100° C. to 170° C. at a speed of 3° C./min, in film tension mode, at a strain=10 μm and a frequency=1 Hz.

EXEMPLARY EMBODIMENTS

The following abbreviations are used:
SBR styrene-butadiene rubber
LA lactide
PLA polylactide
% 1,2-PB molar content of 1,2-polybutadiene (vinyl) units
% 1,4-PB molar content of 1,4-polybutadiene units
% PS molar content of styrene units
Mol molar
Mass by mass
Fin comp final composition
DSC differential scanning calorimetry
DMA dynamic mechanical analysis
E' Young's complex modulus
Sn/P $Sn(oct)_2/P(Ph)_3$ molar ratio
Tsetpoint setpoint temperature of the extruder
Tmixture temperature of the mixture in the extruder measured
Sscrews rotational speed of the extruder screws
Mp PLA melting point of the PLA phase in ° C.
ΔHf PLA enthalpy of fusion of the PLA phase in J/g Example 1: PLA-SBR-PLA Triblock Copolymers Obtained by Polymerization of Lactide on an Amine-Difunctionalized SBR by Reactive Extrusion Aromatic primary amine-difunctionalized SBRs (styrene-butadiene rubbers) were tested. As control, use is made of a non-functionalized SBR with a higher Mn so as to be closer to the Mn of the copolymers synthesized.

The aromatic primary amine-difunctionalized SBRs were synthesized according to the following protocol, described in detail herein for a difunctionalized SBR of 87 300 g/mol:

Preparation of the Solution of Initiator (Si):

The following are successively added into a reactor of 30 l in total: 11.5 l of methylcyclohexane (MCH), 1 l of 4-bromo-N,N-bis(trimethylsilyl)aniline (sparged beforehand with nitrogen), 5.35 l of a solution of s-BuLi at 1.4 mol/l in cyclohexane and 0.35 mol of tetramethylethylenediamine (TMED) purified beforehand on $Al_2O_3$.

The reaction is left at ambient temperature for 24 h. This solution is then stored at 15° C.-20° C. under nitrogen before use. This solution is subsequently referred to as "Si solution".

Polymerization and Coupling:

The following various constituents are successively added into the reactor: 56 l of MCH, 350 ppm of tetrahydrofuran (THF), 2.7 kg of styrene, 5 kg of butadiene, 65 ml of n-BuLi (0.1 mol/l) and 1.07 l of the Si solution.

After 50 min at 50° C., conversion is 70%, and 0.48 equivalent of $Me_2SiCl_2$ relative to the $Li^+$ is added for the coupling. The reaction mixture is stirred at 60° C. for 30 min. 0.4% by weight, relative to the weight of the elastomer, of an Irganox® 2246 (2,2'-methylenebis(6-t-butyl-4-methylphenol))/6PPD (80/20 m/m) mixture is then added.

Deprotection:

The deprotection conditions are the following: 2 eq of HCl/amine for 48 h at 80° C. Once the deprotection reaction has ended, the reaction medium is washed with raw water in order to extract the maximum amount of acid and to raise the pH of the aqueous phase to 7. A sodium hydroxide solution can be used to raise the pH above 7 (0.5 eq sodium hydroxide/HCl).

The polymer solution is then stripped, and the functionalized elastomer is dried in a rotary oven under nitrogen and then in an incubator at 60° C. under vacuum.

Results:

The number-average molar mass obtained is 87 300 g/mol (PI=1.1) and the content of functions is 0.2 mol % relative to the elastomer.

The microstructures and the macrostructures of these functionalized SBRs are given in the following table:

TABLE 1

| | Macrostructure | | Microstructure | | |
|---|---|---|---|---|---|
| | Mn (g/mol) | PI | % 1,4-PB | % 1,2-PB | % PS |
| SBR-A | 68 200 | 1.1 | 49.30% | 36.10% | 14.60% |
| SBR-B | 87 300 | 1.1 | 63.10% | 24.10% | 12.80% |

TABLE 1-continued

|  | Macrostructure | | Microstructure | | |
| --- | --- | --- | --- | --- | --- |
|  | Mn (g/mol) | PI | % 1,4-PB | % 1,2-PB | % PS |
| SBR-C | 96 500 | 1.12 | 62.30% | 24.20% | 13.10% |
| SBR- control | 179 100 | 1.04 | 61.7% | 20.7% | 17.7% |

A DSM Xplore microextruder with a capacity of 15 g is used.

Two processes were carried out:

P1: Addition without Sequencing

The functionalized SBR previously obtained (8.4 g), which has been predried, is incorporated into the microextruder at the same time as a (lactide/Sn(oct)$_2$/additives) mixture contained in a two-necked round-bottomed flask and prepared beforehand in a glovebox. The term "additives" denotes triphenylphosphine (P(Ph)$_3$) and/or U626 (antioxidant, Ultranox®626, bis(2,4-di-t-butylphenyl)pentaerythritol diphosphite). The temperature of the mixture is maintained at 170° C.

1. Introduction of the SBR/lactide/catalyst/additives into the microextruder (Tmixture=170° C., Sscrews=60 rpm)
2. Polymerization of the PLA (Tsetpoint=180° C., Tmixture=170° C., Sscrews=150 rpm)
3. When the torque has reached a plateau, introduction of the Cata-killer (Irganox® 1425, 28 mg) in order to stop the polymerization P2: Sequenced Addition Sequential introduction of the reagents:

1. Introduction of the functionalized SBR previously obtained (8.4 g) into the microextruder (Tsetpoint=180° C., Tmixture=170° C., Sscrews=60 rpm), of 77% of lactide and of U626. The lactide and the U626 were mixed beforehand in a glovebox in a two-necked round-bottomed flask. The SBR was dried beforehand.
2. Mixing/homogenization of the SBR and of the lactide at 150 rpm for 2 min
3. Introduction of the remaining 23% of lactide in the presence of the catalyst solution Sn(oct)$_2$/P(Ph)$_3$. The whole mixture being contained in a two-necked flask prepared beforehand in a glovebox.
4. Polymerization of the PLA (Tsetpoint=180° C., Tmixture=170° C., Sscrews=150 rpm)
5. When the couple reaches a plateau, introduction of the catalyst inhibitor (Irganox® 1425, 28 mg) to stop the polymerization In the two cases, the functionalized SBR is dried beforehand for 12 h under vacuum at 60° C., until a residual water content of less than 300 ppm is obtained.

These processes, carried out in a microextruder, are batchwise. The various operating conditions are reported in the following table:

TABLE 2

|  | Matrix | SBR/LA (g/g) | [LA/Sn(oct)$_2$] mol | [SBR/Sn(oct)$_2$] mass | Sn/P mol | U626 (% total mass.) | Process |
| --- | --- | --- | --- | --- | --- | --- | --- |
| CP1 | SBR-A | 60/40 | 191 | 102 | 1/1 | 0.25% | P2 |
| CP2 | SBR-A | 60/40 | 200 | 107 | 1/1 | 0.07% | P2 |
| CP3 | SBR-B | 60/40 | 700 | 373 | 1/1 | 0.12% | P2 |
| CP4 | SBR-B | 80/20 | 700 | 373 | 1/1 | 0.06% | P2 |
| CP5 | SBR-A | 60/40 | 700 | 373 | 1/1 | 0.25% | P2 |
| CP6 | SBR-B | 60/40 | 700 | 373 | 1/1 | 0.12% | P1 |
| Control CP | SBR control + 1-octanol | 60/40 | 700 | 373 | 1/1 | 0.1% | P2 |

For each of the triblock copolymers obtained (CP1 to CP6), the appearance on the $^1$H NMR spectra, of -Ph-NH—(C=O)— proton signals at about 7.88 ppm, characteristic of the PLA-SBR-PLA chains, is observed. These protons are logically absent on the spectrum of the material obtained from the nonfunctional SBR (control CP).

The SEC chromatograms of the materials obtained are consistent with the intended structures:

For the polymerizations in the presence of the functional SBRs (intended triblock copolymers), the molar masses of the materials obtained are greater than that of the starting functional SBR. The increase in the molar masses is greater as the fraction of starting lactide increases.

For the polymerization in the presence of the nonfunctional SBR and the 1-octanol (intended synthesis of a PLA homopolymer), the main unresolved peak of the SEC curve is at the same position as that of the starting elastomer. A small secondary unresolved peak, consistent with the obtaining of PLA homopolymer having a average molar mass close to 9500 g/mol, is observed. The other results are reported in the following table:

TABLE 3

|  | Conversion % by $^1$H NMR | Time (min) | Mn PLA (g/mol) [1,2] | Mn triblock (g/mol) SEC | PI triblock (SEC) | Fin comp SBR/PLA (mass) $^1$H NMR |
| --- | --- | --- | --- | --- | --- | --- |
| CP1 | 92% | 9.5 | 15 000 | 117 700 | 2.1 | 65/35 |
| CP2 | 91% | 4.5 | 15 700 | 132 500 | 2.6 | 64/36 |
| CP3 | 93% | 8 | 15 600 | 133 600 | 1.9 | 65/35 |
| CP4 | 86% | 6 | 5500 | 112 100 | 2.3 | 84/16 |
| CP5 | 94% | 8 | 18 400 | 166 300 | 1.2 | 64/36 |
| CP6 | 94% | 6 | 15 600 | 132 600 | 3 | 65/35 |
| Control CP | 94% | 45 | 9500 | 142 300 | 2.8 | 67/33 Mixture |

[1] Mn of each PLA block calculated by the following formula:

$$M_n^{PLA\,block} = \frac{1}{2} \cdot \frac{M_n^{SBR,SEC\,eq.PS}}{1 - \%\,massPLA^{NMR}} \cdot \%\,massPLA^{NMR}$$

[2] Mn of the PLA homopolymer determined by SEC in PS equivalent.

Figure 2A:
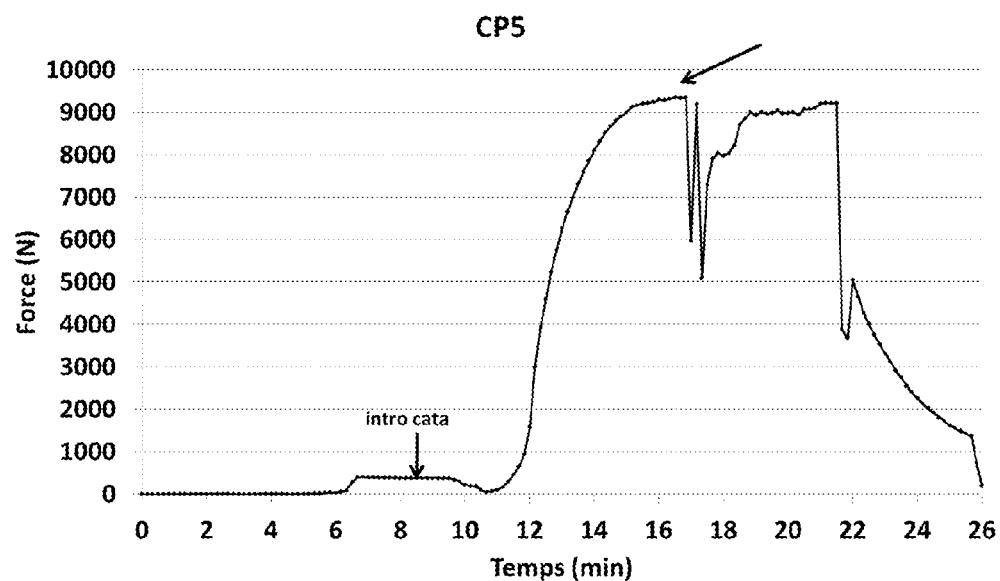
FIGS. 2A and 2B show the change in vertical force exerted on the barrels by the extruded material.
Figure 2B:
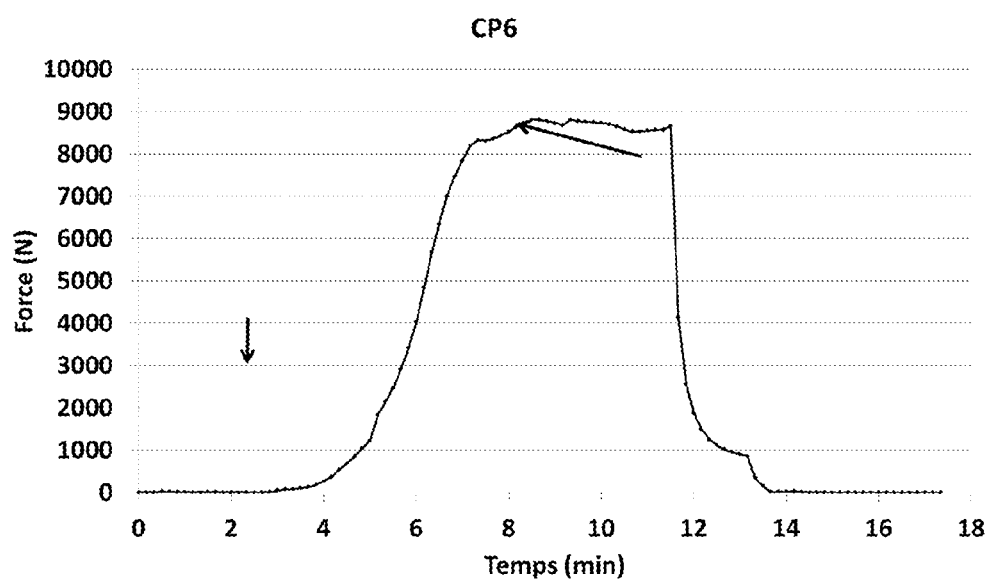

The vertical force exerted on the barrels by the extruded material beings to increase as soon as the catalytic system is introduced (arrow at about 10 min in FIG. 2A, at about 2 min in FIG. 2B). Then the force reaches a maximum which corresponds to the end of the polymerization (arrow at about 10 min in FIG. 2A, at about 8 min in FIG. 2B). The change in the vertical force for the CP5 and CP6 tests is given in FIG. 2 (FIGS. 2A and 2B respectively).

DSC

The results are reported in the following table, in which, when two melting peaks are observed, the two values are indicated:

TABLE 4

| DSC | 1st cycle | | 2nd cycle |
|---|---|---|---|
| | Mp PLA (° C.) | ΔHf PLA (J/g PLA) | Tg SBR (° C.) |
| CP3 | 153 | 9.1 | −55 |
| | 168 | | |
| CP4 | / | 0 | −55 |
| CP2 | 151 | 5.6 | −38 |
| | 166 | | |
| CP5 | 160 | 0.8 | −55 |
| | 170 | | |
| CP6 | / | 0 | −56 |
| Control CP | 164 | 41.5 | −46 |

The presence of a crystalline phase of PLA is noted for the copolymers consisting of long PLA blocks (14 kg/mol (CP2) and 15 kg/mol (CP3)). The percentage crystallinity is however low given the enthalpies of fusion measured, of about 2 to 6 J/g (an annealing at 110° C. would make it possible to increase this value). This low crystallinity is explained by the presence of the central SBR block. 2 fusion peaks most certainly consistent with 2 different crystalline phase are observed on the thermograms. The melting points of the PLA phases are greater than 150° C. In the 2nd cycle, the Tg of the PLA close to 60° C. is clearly observed (Table 4).

The control mixture also shows a melting peak and the crystallinity is much higher (ΔHf=41 J/g).

Tensile Tests

The results are reported in the following table:

TABLE 5

| TENSILE FORCE | Tensile strength* (MPa) | Elongation at break* (%) |
|---|---|---|
| CP3 | 10.1 (0.44) | 520 (25) |
| CP4 | 1.9 (0.17) | 540 (29) |
| CP2 | 8.7 (0.37) | 460 (10) |
| Control mixture | 0.3 | 16 (3) |

*the standard deviation has been indicated between parentheses

It is noted:
That the elongation at break is high for the 3 copolymers (CP2, CP3, CP4): from 460% to 540%. It is independent of the length of the PLA blocks.
That the elongation at break increases with the length of the SBR block: CP2 with an SBR-A block of Mn=68 kg/mol has an elongation at break of 460%, while CP3 with an SBR-B block of Mn=87 kg/mol has an elongation at break of 520%.
Conversely, the tensile strength appears to be dependent on the length of the PLA blocks:
For the long blocks (14 kg/mol and 15 kg/mol, CP2 and CP3): tensile strength=8.7 to 10.1 MPa.
For the short blocks (5 k, CP4): tensile strength=1.9 MPa Contrary to the copolymers, the control mixture has no mechanical strength.

DMA

The results are reported in the following table:

TABLE 6

| DMA (Tg determined by inflection point on curve E' = f(T)) | Tg SBR (° C.) | Tg PLA (° C.) |
|---|---|---|
| CP3 | −68 | 51 |
| CP4 | −67 | / |
| CP2 | −48 | 53 |
| Control mixture | −60 | / |

A significant drop in E' at the Tg of the elastomer is noted. A rubbery plateau appears quite clearly for the copolymers over a temperature range [−20° C., 90° C.]. In comparison, the SBR/PLA control mixture also exhibits a rubbery plateau, but its temperature range is more restricted [−20° C., 20° C.].

Example 2: SBR-g-PLA Comb Copolymers Obtained by Polymerization of Lactide on an Alcohol-Functionalized SBR by Reactive Extrusion Copolymers of comb type (SBR-g-PLA) were synthesized by polymerization of the lactide, in the presence of a functional SBR having mercapto 1-butanol groups grafted along the chain.

This functional SBR is prepared according to the following procedure.

Grafting:

After complete dissolution of 110 g of SBR in 2.75 l of methylcyclohexane, 6.3 ml of 4-mercaptobutanol, dissolved beforehand in 135 ml of dichloromethane, are added. Once the temperature of the reaction medium is at 80° C., 1 g of lauroyl peroxide dissolved in 50 ml of methylcyclohexane is introduced with stirring. The medium is kept at 80° C. with stirring overnight.

At 80° C., 2 equivalents, relative to the peroxide, of Irganox® 2246 are added. After 15 minutes, 2 equivalents, relative to the peroxide, of 6-PPD are added. After cooling, one or two coagulations in methanol are carried out.

The functionalized elastomer is then redissolved, and 0.4% by weight, relative to the weight of the elastomer, of an Irganox®2246/6PPD (80/20) mixture is added. The functionalized elastomer is then dried under vacuum at 50° C.

Results:

The grafting obtained is 1.3 mol %, and the yield by mass obtained is 82%.

The microstructures and macrostructures of this functionalized SBR are given in the following table:

TABLE 7

| Macrostructure | | Microstructure | | | |
|---|---|---|---|---|---|
| Mn (g/mol) | PI | % 1,4-PB | % 1,2-PB | % PS | % OH |
| 204 700 | 1.3 | 19.7 | 62.2 | 16.8 | 1.3 |

Polymerization conditions: the synthesis was carried out in a microextruder in accordance with the experimental protocol described in Example 1, P2 (sequenced addition).

The various operating conditions tested are reported in the following table:

TABLE 8

| | SBR/LA (g/g) | [LA/Sn(oct)$_2$] mol | [SBR/Sn(oct)$_2$] mass | Sn/P mol | U626 (% total mass.) |
|---|---|---|---|---|---|
| CP'1 | 60/40 | 700 | 373 | 1/1 | 0.07% |

For the comb copolymer obtained (CP'1), it is observed on the $^1$H NMR spectra that the signal at 3.64 ppm has disappeared. Consequently, all the —S—(CH$_2$)$_4$—OH functions have initiated the polymerization of the lactide.

The results are reported in the following table:

TABLE 9

| | Conversion | | | Mn triblock | | Fin comp |
|---|---|---|---|---|---|---|
| | % by $^1$H NMR | Time (min) | Mn PLA$^1$ block (g/mol) | (g/mol) SEC | PI triblock | SBR/PLA (mass) $^1$H NMR |
| CP'1 | 91.1% | 5 | 2200 | 229 400 | 2.1 | 63/37 |

$^1$Mn of each block calculated by the following formula:

$$M_n^{PLA\,block} = \frac{1}{\text{Number of OH functions per chain}} \cdot \frac{M_n^{SBR,SEC\,eq.PS}}{1 - \%\,massPLA^{NMR}} \cdot \%\,massPLA^{NMR}$$

Tensile Tests
The results are reported in the following table:

TABLE 10

| TENSILE FORCE | Tensile strength (MPa) | Elongation at break (%) |
|---|---|---|
| CP'1 | 11.8 | 440 |

The results of the tensile tests show:
a mean elongation at break of 440%
a mean tensile strength of 11.8 MPa
DMA
The results of the DMA tests show:
the appearance of a rubbery plateau
the range of temperature resistance up to 60° C.

Example 3: PLA-SBR-PLA Triblock Copolymers Obtained by Polymerization of Lactide on an Amine-Functional SBR by Reactive Extrusion—Continuous Process The tests were also carried out in a twin-screw extruder, having an L/D ratio of 56 and comprising 14 independent heating zones (L/D=4), allowing a continuous synthesis. The rotational speed of the screws is 70 rpm. The setpoint temperatures of the barrels are reported in the following table:

TABLE 11

| Barrel temperatures (° C.) | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| 50 | 80 | 180 | 180 | 180 | 180 | 180 | 180 | 180 | 180 | 180 | 180 | 180 | 180 |

The aromatic primary amine-difunctionalized SBR was synthesized according to the protocol given in Example 1.

The microstructures and macrostructures of this difunctionalized SBR are given in the following table:

TABLE 12

| Macrostructure | | Microstructure | | |
|---|---|---|---|---|
| Mn (g/mol) | PI | % 1,4-PB | % 1,2-PB | % PS |
| 87 300 | 1.1 | 32.0 | 44.0 | 24.1 |

This SBR is dried for 12 h at 60° C. in air.

The lactide is introduced into barrel No. 1, the functionalized SBR (as a mixture with 2% by weight of EVA) is introduced into barrel 2 and the catalytic system is introduced into barrel 3. The SBR/lactide ratio by mass is 60/40. The [LA/Sn(oct)$_2$] molar ratio is 700, and P(Ph)$_3$ is added in an amount which makes it possible to have an (Sn/P) molar ratio of 1/1. The conversions and the properties of the copolymer obtained are reported in the following table:

TABLE 13

| Conversion | | | Fin comp | Triblock | | Mechanical properties | |
|---|---|---|---|---|---|---|---|
| % by $^1$H RMN | Time (min) | Mn PLA (g/mol)$^1$ | SBR/PLA (mass) $^1$H NMR | macrostructure Mn (g/mol) | PI | Tensile strength (MPa) | Strain at break (%) |
| 91 | 8.4 | 23 500 | 80/20 | 108 800 | 3.0 | 2.0 | 160 |

$^1$Mn of each PLA block calculated by the following formula:

$$M_n^{PLA\,block} = \frac{1}{2} \cdot \frac{M_n^{SBR,SEC\,eq.PS}}{1 - \%\,massPLA^{NMR}} \cdot \%\,massPLA^{NMR}$$

The invention claimed is:
1. A process for preparing a diene elastomer/polylactide copolymer comprising the step of introducing into an extruder:

lactide;
a diene elastomer functionalized by at least one group bearing at least one function capable of initiating a ring-opening polymerization of the lactide to form a functionalized diene elastomer, the functionalized diene elastomer having a number-average molar mass, Mn, of greater than 40,000 g/mol; and
a catalytic system,
wherein a weight percentage of polylactide is between 10% and 45% by weight, relative to a weight of the diene elastomer/polylactide copolymer.

2. The process according to claim 1, wherein the step of introducing into an extruder comprises the steps of:
introducing the lactide and the functionalized diene elastomer into an extruder;
mixing the lactide and the functionalized diene elastomer to obtain a mixture; then
introducing the catalytic system into the mixture, the introduction of the catalytic system triggering polymerization; then
introducing a catalyst inhibitor to stop polymerization;
recovering the diene elastomer/polylactide copolymer at an outlet of the extruder.

3. The process according to claim 1, wherein polymerization is carried out at a temperature ranging from 80° C. to 200° C.

4. The process according to claim 1, wherein polymerization time is less than 30 minutes.

5. The process according to claim 1, wherein a weight percentage of the lactide introduced ranges from 12% to 47% by weight, relative to the total weight of the functionalized diene elastomer introduced and the lactide introduced.

6. The process according to claim 1, wherein polymerization is carried out in bulk.

7. The process according to claim 1, wherein the process is a continuous process.

8. The process according to claim 7, wherein the function capable of initiating a ring-opening polymerization of the lactide is a primary amine —NH$_2$ or a hydroxyl —OH.

9. The process according to claim 1, wherein an antioxidant is also introduced.

10. The process according to claim 2, wherein an antioxidant is also introduced with the lactide and the functionalized diene elastomer.

11. The process according to claim 1, wherein the diene elastomer is selected from the group consisting of polybutadienes, synthetic polyisoprenes, natural rubber, butadiene copolymers, isoprene copolymers, ethylene/diene copolymers, and blends thereof.

12. The process according to claim 1, wherein, in the diene elastomer/polylactide copolymer, the weight percentage of polylactide ranges from 15% to 40% by weight, relative to the weight of the diene elastomer/polylactide copolymer.

13. The process according to claim 1, wherein the diene elastomer is functionalized by two end groups to form the functionalized diene elastomer.

14. The process according to claim 13, wherein the number-average molar mass, Mn, of the diene elastomer ranges from more than 40,000 g/mol to 250,000 g/mol.

15. The process according to claim 13, wherein the number-average molar mass, Mn, of the diene elastomer ranges from 50,000 g/mol to 200,000 g/mol.

16. The process according to claim 1, wherein the diene elastomer is functionalized by several pendant groups along the backbone to form the functionalized diene elastomer.

17. The process according to claim 16, wherein the number-average molar mass, Mn, of the diene elastomer ranges from 100,000 g/mol to 500,000 g/mol.

18. The process according to claim 1, wherein the diene elastomer/polylactide copolymer is a triblock, of structure PLA-diene elastomer-PLA, having a number-average molar mass, Mn, ranging from 50,000 g/mol to 300,000 g/mol.

19. The process according to claim 1, wherein the diene elastomer/polylactide copolymer is a comb copolymer, having a diene elastomer backbone and pendant PLA blocks along the backbone, having a number-average molar mass, Mn, ranging from 100,000 g/mol to 600,000 g/mol.

* * * * *